Sept. 18, 1951   H. L. BAKER ET AL   2,567,985
RECAPPING AND RETREADING MOLD

Filed March 30, 1946   5 Sheets—Sheet 1

INVENTORS
HAROLD L. BAKER
RAYMOND D. VAN TASSELL
BY
ATTORNEYS

Sept. 18, 1951  H. L. BAKER ET AL  2,567,985
RECAPPING AND RETREADING MOLD
Filed March 30, 1946  5 Sheets-Sheet 2
Fig-3-
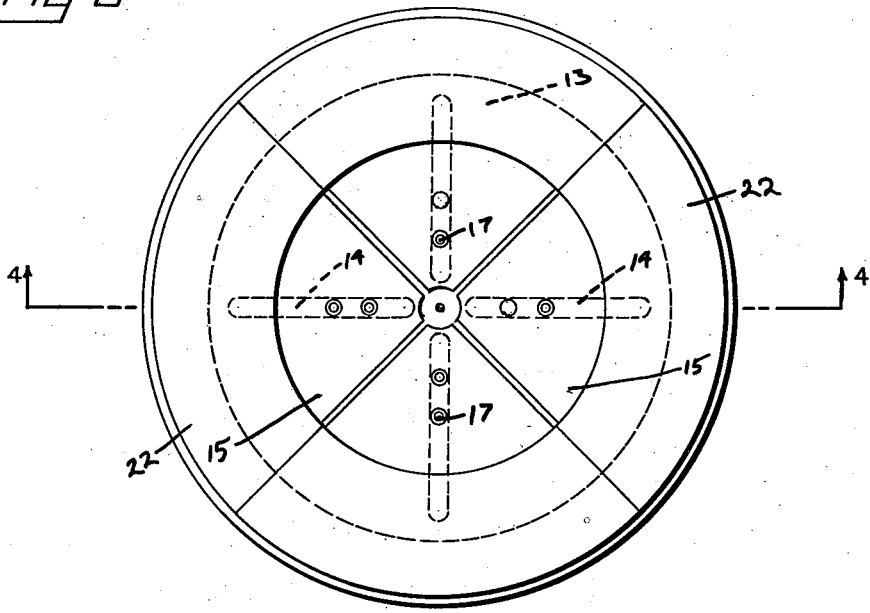
Fig-4-
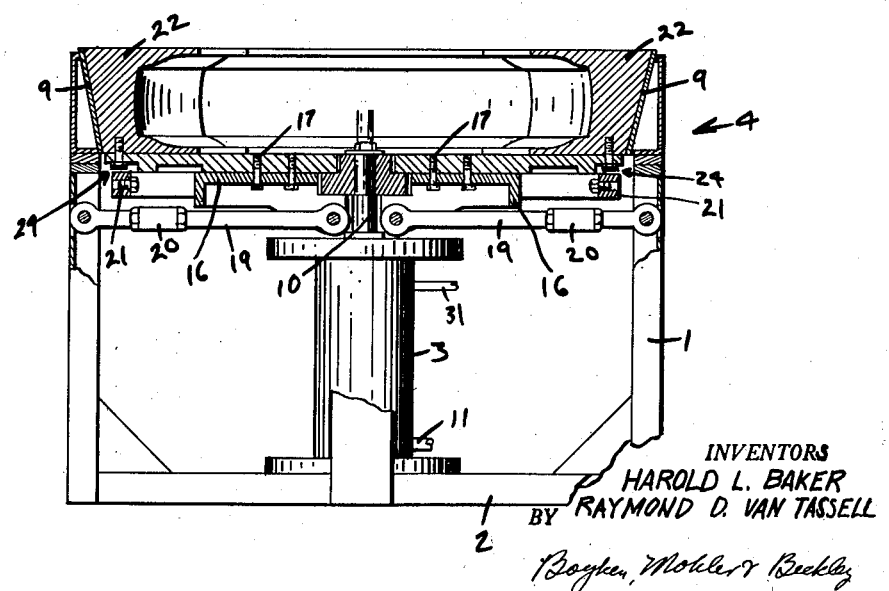
INVENTORS
HAROLD L. BAKER
BY RAYMOND D. VAN TASSELL
Boyken, Mohler & Beckley
ATTORNEYS Sept. 18, 1951  H. L. BAKER ET AL  2,567,985
RECAPPING AND RETREADING MOLD
Filed March 30, 1946  5 Sheets-Sheet 3
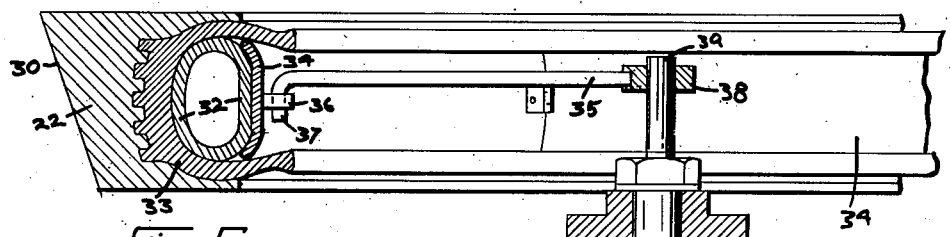
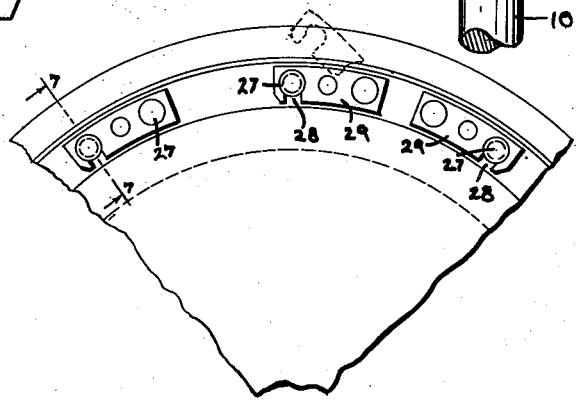
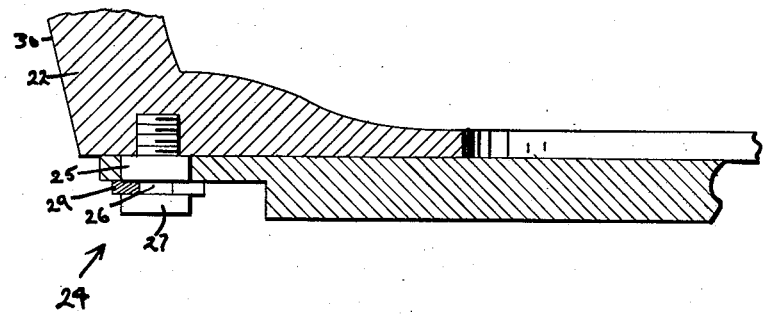
INVENTORS
HAROLD L. BAKER
RAYMOND D. VAN TASSELL
BY
ATTORNEYS Sept. 18, 1951     H. L. BAKER ET AL     2,567,985
RECAPPING AND RETREADING MOLD
Filed March 30, 1946     5 Sheets-Sheet 4
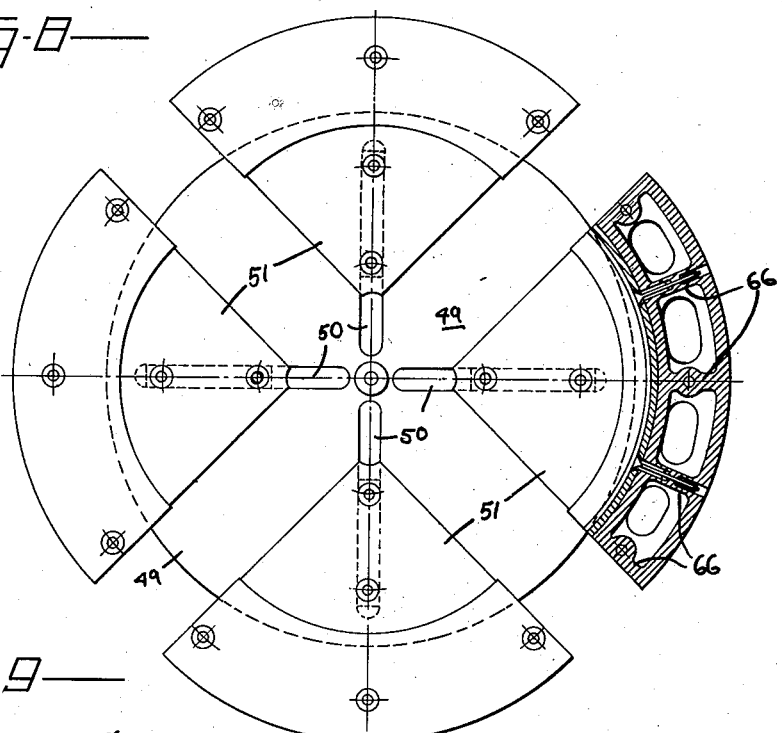
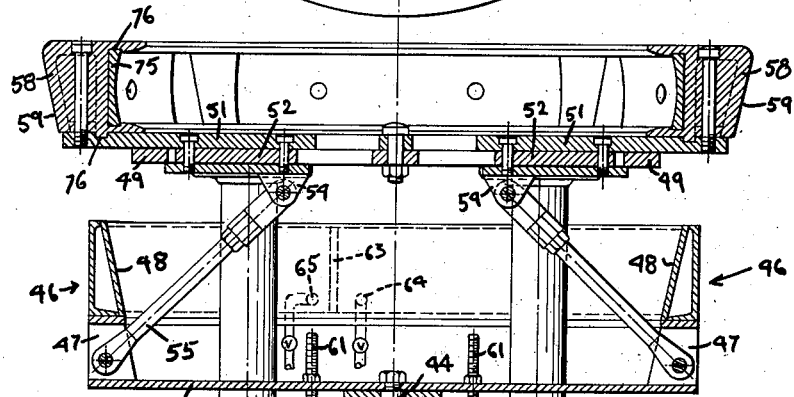
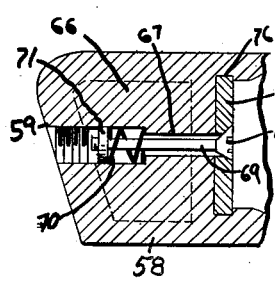
INVENTORS
HAROLD L. BAKER
RAYMOND D. VAN TASSELL
BY
ATTORNEYS Patented Sept. 18, 1951

2,567,985

UNITED STATES PATENT OFFICE 2,567,985

RECAPPING AND RETREADING MOLD

Harold L. Baker, Fresno, and Raymond D. Van Tassell, Danville, Calif.

Application March 30, 1946, Serial No. 658,522

10 Claims. (Cl. 18—18)

This invention relates to tire vulcanizing molds and more particularly to a vulcanizing mold that may be used for recapping or for retreading a tire casing. Hereinafter the mold will be referred to as a "retreading" mold with the understanding that the designation is not to be considered restrictive of the invention.

One of the objects of the invention is the provision of a retreading mold that is adapted to accomplish the retreading of a tire, including the insertion and release of the tire from the mold more conveniently, efficiently, and faster than heretofore.

Another object of the invention is the provision of a retreading mold in which the annular matrix is divided into a plurality of segments that are adapted to move simultaneously and bodily directly radially outwardly of the central axis of the matrix from a closed or curing position, and vice versa, and which mold includes heating means automatically positioned in heat transfer relation to said matrix when said segments are in curing position.

A still further object of the invention is the provision of means in a retreading mold for quickly releasing a tire casing from the matrix or matrices without injury to the tread or casing in the event the tire casing should become stuck to one or more of the matrices.

Other objects and advantages will appear in the description and in the drawings.

In the drawings, Fig. 1 is a top plan view showing the segments of the matrix in open position.

Fig. 3 is a top plan view of the mold showing the segments of the matrix in curing position.

Fig. 4 is a sectional view taken along the line 4—4 of Fig. 3.

Fig. 5 is an enlarged fragmentary sectional view of a portion of the mold showing a tire casing in the mold and the means for releasing the tire casing from any segment of the matrix to which it may be stuck.

Fig. 6 is an enlarged fragmentary elevational view showing releasable locking means for locking the segments of the matrix to the matrix plate.

Fig. 7 is an enlarged sectional view taken along line 7—7 of Fig. 6.

Fig. 8 is a top plan view (partly in section) showing a modified form of the mold when the segments thereof are in expanded or open position.

Fig. 9 is a vertical sectional view through the mold of Fig. 8.

Fig. 12 is an enlarged fragmentary sectional view taken through one of the air inlets in one of the segments of the matrix for admitting air under pressure to blow the tire casing loose from a segment to which it may become stuck.

Figure 1:
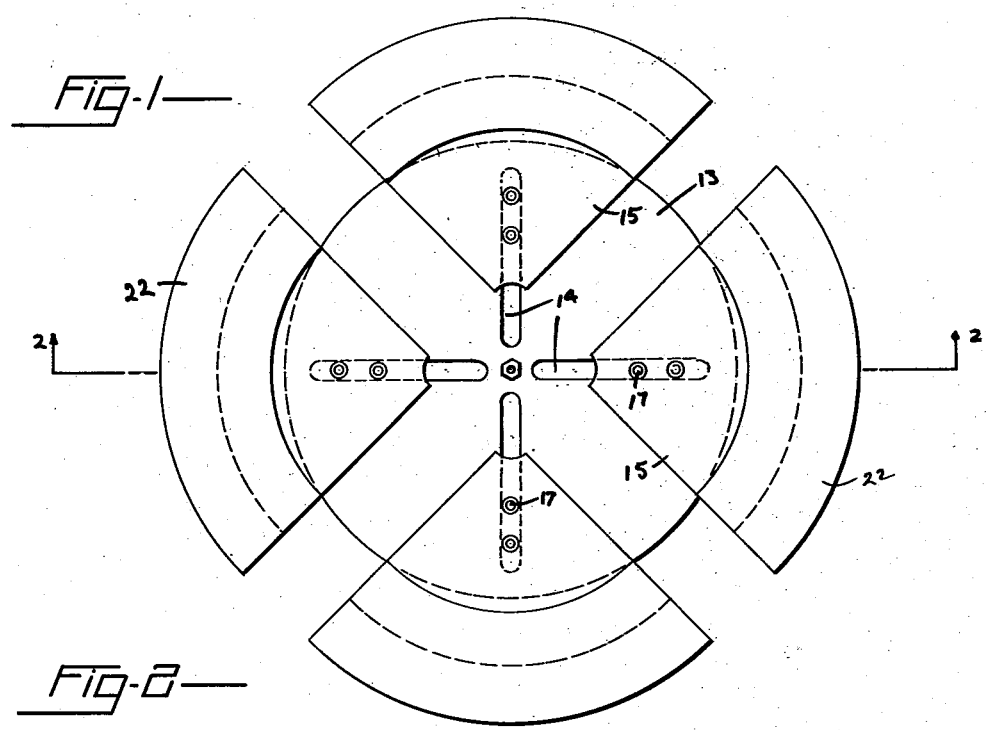

In detail, the mold illustrated in Figs. 1 to 7 comprises a frame that includes legs 1 connected by base members 2, which base members may carry a vertically disposed hydraulic cylinder 3 equally spaced from said legs.

Supported on the upper ends of legs 1 is an annular hollow member 4 that provides a steam chamber having a partition 6 at one point therein, and a steam inlet 7 and an outlet 8 at opposite sides of said partition, which inlet and outlet are suitably valved in the conventional manner for controlling the admission and discharge of steam to within said chamber.

Figure 2:
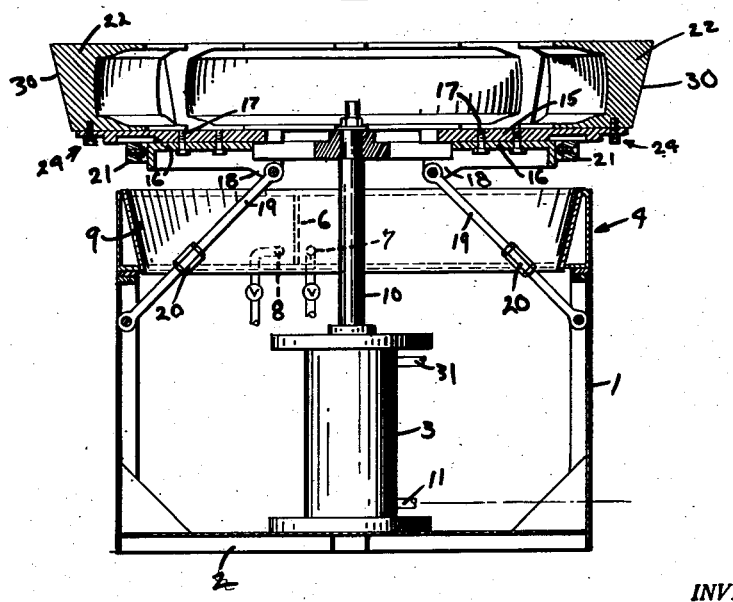
Fig. 2 is a vertical sectional view through the mold when the segments of the matrix are in open position, which view is taken along line 2—2 of Fig. 1.

The radially inwardly facing wall 9 of said steam chamber tapers upwardly and outwardly transversely of the chamber, as best seen in Figs. 2, 4.

A piston rod 10 extends vertically upwardly through the head of cylinder 3, said rod being connected at its lower end with a conventional piston (not shown) that is reciprocable in cylinder 3. Any suitable valved fluid pressure line 11 connects with the lower end of the cylinder 3 for admitting fluid under pressure into the cylinder below the piston and for discharge of fluid from said cylinder for causing the rod to reciprocate vertically.

The upper end of rod 10 is secured to a table 13 that is formed with four equally spaced slots 14 extending radially of the axis of rod 10, and which slots are equally spaced from said rod.

Slidably supported on table 13 are four equal sections 15 of a circular matrix plate, each of which sections is positioned over a slot 14, and guide strips 16 are respectively secured by cap screws 17 to each section 15 of the matrix plate, which strips extend into slots 14 for sliding therein longitudinally of the latter.

A depending ear 18 is on each strip 16, and links 19 are respectively pivoted at one of their ends to said ears, the opposite ends of said links being pivotally secured to each of the four legs 1. Each link 19 is preferably in two pieces, which pieces are connected by a turnbuckle connector 20 for adjusting the length of each link. Also adjustable stops 21 are provided at the ends of slots 14 for providing bumpers adapted to be simultaneously engaged by the strips 16 at the ends of their outward movement in said slots.

Secured along the peripheral outer edge of each section 15 is a segment 22 of the matrix, said matrix being annular and divided equally to form four equal segments 22. These segments are in end to end relation to form the annular matrix when the segments are in closed or curing position as seen in Figs. 3, 4.

Each segment 22 is releasably secured to one of the sections 15 by a stud and latch structure, as best seen in Figs. 6, 7, in which a plurality of spaced stud bolts 24 are secured to the underside of each segment 22. These studs are each formed with an enlarged portion 25 (Fig. 7) that extends through an opening in the margin of the section 15 and which enlargement also provides a stop shoulder abutting the section.

A restricted neck portion 26 is between the head 27 of the stud bolt and the enlargement 25. This neck portion 26 is adapted to be received between the sides of a slot 28 (Fig. 6) that opens inwardly of one side of the outer end of a latch bar 29. There is a latch bar 29 for each stud bolt, and each latch bar is pivotally secured to the section 15 at the inner end of each bar for swinging of the outer end to and from a position engaging the stud bolts. When the latch bars are swung to positions out of engagement with the stud bolts the segments 22 may be lifted from the sections 15 for replacement by other segments for accommodating different sized tire casings.

The outer peripheral sides 30 (Fig. 2) of the matrix segments are inclined to correspond with the inclination of the inner sides 9 of the steam chamber 4, and when the segments 22 are in closed curing position, the said sides 30, 9 are in close heat transfer engagement with each other and the links 19 are substantially horizontal, as seen in Fig. 4.

In operation, fluid pressure is admitted through pressure line 11 into the lower end of cylinder 3, thus moving the piston rod 10 upwardly and elevating the sections 15, including the segments 22 carried thereby. Since links 19 are secured to the legs 1 at one of their ends, the upward movement of the sections 19 will result in the opposite ends of links 15 moving radially outwardly relative to the central axis of the matrix, and consequently the strips 16 and segments 22 will be simultaneously moved radially outwardly of said axis to open position indicated in Figs. 1, 2.

The tire casing may be placed on the sections 15 coaxial with the central axis of the matrix, and then fluid under pressure may be admitted into the upper end of cylinder 3 through line 31 for causing the piston to move downwardly carrying the sections 15 and the matrix with it. The matrix segments will automatically move radially inwardly to the closed or curing position and at the same time the sides 30 of the matrix segments will move into heat transfer engagement with the sides 9 of the steam chamber.

There is the conventional bag 32 within the tire casing 33 (Fig. 5) when the segments 22 are in closed position to produce the requisite internal pressure, said bag being held in the casing by the usual collapsible rim 34.

The retreading or recapping rubber on the casing is cured by the heat from the steam chamber and the pressure from the air bag, after which the sections 15 are again elevated by admission of fluid under pressure into the lower end of the cylinder 3, it being understood that the upper line 31 is open to discharge or to the inlet side of a pump where such pump may be used to create the desired pressure.

In the event that the casing 33 should be stuck in any one of the segments, a bar 35 is connected to the rim 34 at the side where the sticking occurs, or at the opposite side, which rim is provided with an eye 36 for an angular extension 37 at one end of said bar. The opposite end of the bar has a collar 38 that is adapted to receive an upward extension 39 of the piston rod 10. Thus the tire will be held against being pulled to one side by the segment in which it is stuck and the tire will be pulled loose from the segment as the segments continue their movement to open position. The bag 32 does not normally stick to the casing, and under any circumstance its degree of adhesion is negligible. The degree of radial movement of each segment 22 is substantially greater than the maximum degree to which the bag 32 can be flattened at any one side, and as the conventional casing is incapable of stretching circumferentially no difficulty is experienced in releasing the casing from any of the segments.

When the segments are in open position the casing may readily be lifted from the sections 15 on which it is supported, and a new tire may be quickly placed on said sections for repeating the operation.

The mold of Figs. 8 to 12 is practically the same as that described above, except that the steam chamber moves downwardly away from the matrix, instead of the matrix moving upwardly away from the steam chamber.

There are other features in the mold of Figs. 8 to 12 that may be used with the mold of Figs. 1 to 7 without difficulty, and these features will be described in due course.

The mold of Figs. 8 to 12 comprises vertical legs 40 and a base member 41 securing their lower ends in spaced relation. A vertical hydraulic cylinder 43 is on said base equally spaced from said legs. Said cylinder contains a vertically reciprocable piston therein (not shown) and a piston rod 44 secured at one end to said piston extends through the cylinder head.

The upper end of the piston rod 44 is secured to a horizontal plate 45 centrally of the latter, said plate carrying an annular hollow member 46 spaced above its marginal portion by legs 47. Thus member 46 provides a steam chamber that is identical with the member 4 of Figs. 1, 2, having an inner upwardly and outwardly inclined side wall 48.

Secured on the upper ends of legs 40 is a radially slotted table 49, said slots being indicated at 50 (Figs. 9). Equal sized sections 51 of a circular matrix plate are supported over said table and each section has a guide strip 52 extending through the slot 50 therebelow. Ears 54 depend below said guide strips and are secured to said strips. There are four sections 51 in the mold of Figs. 8 to 11, the same as in the previously described mold, and there are also four legs 40.

A link 55 is pivotally secured at one end to each ear 54, and the opposite end of each link is pivotally secured to each leg 47 that is rigid with the steam chamber.

Secured on the matrix sections 51 are matrices or segments 58 of the annular matrix. These segments have outer inclined side walls 59 that correspond in inclination to the inclined walls 48 of the steam chamber.

Figure 10:
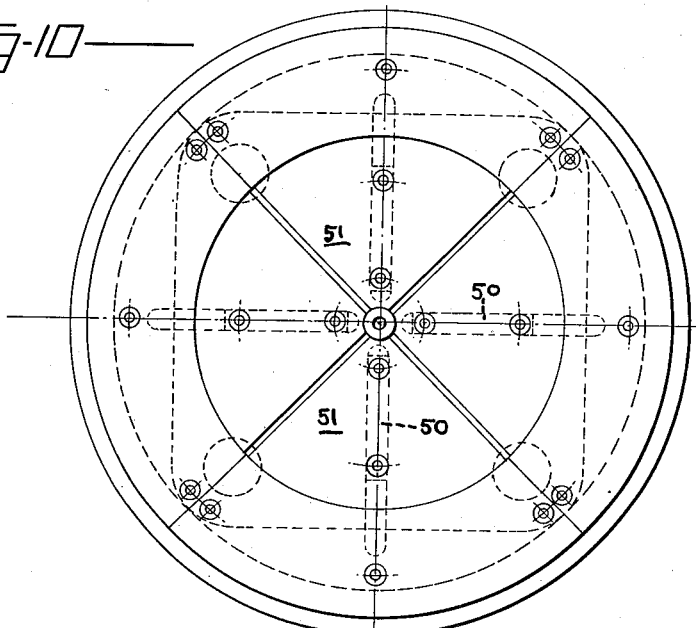
Fig. 10 is a top plan view of the mold of Fig. 8 in closed or curing position.
Figure 11:
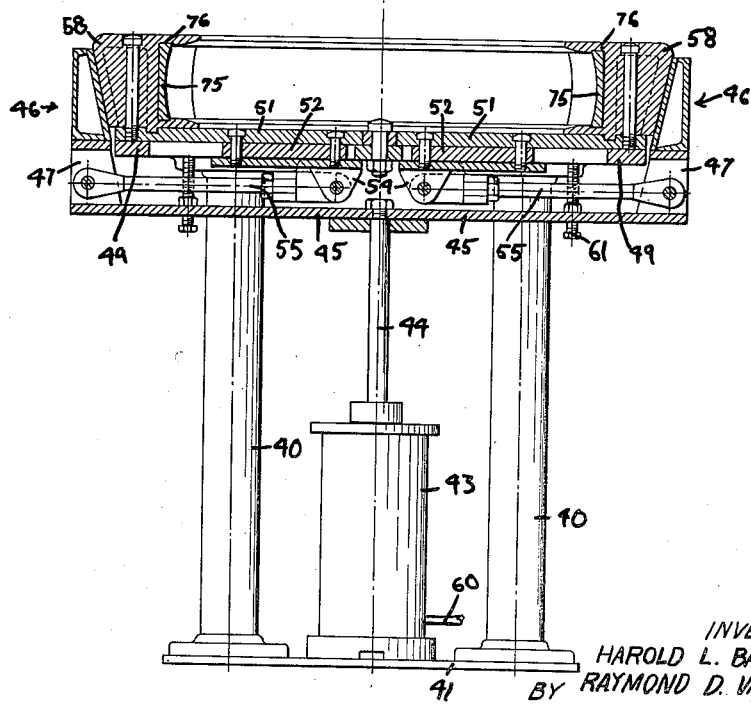
Fig. 11 is a vertical sectional view of the mold of Fig. 10.

The segments 58 form a continuous annular matrix when they are in end to end adjoining relation as seen in Figs. 10, 11, and which position may be termed the curing or closed position. When said segments are in the curing position the links 55 are horizontal and the matrix is circumferentially enclosed by the steam chamber in heat transfer relation with said chamber. Also fluid under pressure has been admitted into the lower end of cylinder 43 through line 60 causing the piston rod and the steam chamber to be in elevated position.

Upon releasing the fluid pressure below the piston in cylinder 43 the plate 45 and the steam chamber will be lowered, whereupon the links 55 will automatically pull the sections 51 and the matrix segments 58 to open position as seen in Figs. 8, 9 for removal of a vulcanized tire or insertion of another casing to be recapped or retreaded.

Adjustable stops 61 may be carried by the plate 45 for abutting the underside of the table 49 thus limiting the upward movement of the steam chamber.

The steam chamber itself has a partition 63 (Fig. 9) at a point therein, and a valved steam inlet 64 and outlet 65 are respectively at opposite sides of said partition.

Each segment 58 is hollow and formed with a plurality of spaced ribs 66, several of which may be formed with through passageways 67 (Fig. 12) that open at one of their ends outwardly of the outer peripheral surface of the segments, while the inner or opposite ends of said passageways open into the tread portion of each segment.

The inner ends of passageways 67 where they open into the tread portion of each segment are flared outwardly and a tapered valve member 68 of the tappet type is seated in each flared end closing the passageway to flow of rubber into the passageway. Each member 68 has a stem 69 around which is an expansion coil spring 70 reacting between a collar 71 and a shoulder in each passageway for yieldably holding the valve member 68 closed.

The outer end of each passageway 67 is threaded to receive a standard fitting on the end of a compressed air line. In the event a casing should become stuck to any segment 58, the tread may readily be blown loose from the segment without injury to the casing by affixing a compressed air hose in the proper passageway 67.

In this form of the invention the tread portion of each matrix segment may be provided with a removable tread plate 75 that may be slid longitudinally out of the segment after removal of the valves for replacement by other tread plates of different design.

It is obvious that the same or similar provision for releasing tires from the matrix segments by blowing them loose may be used in the form of the invention shown in Figs. 1 to 7, and also the means employed in Figs. 1 to 7 for mechanically releasing a stuck tire may be used in the form of mold shown in Figs. 8 to 12. Where the valves 68 are not used, the removal of tread plates 75 is greatly simplified.

The structure for securing said tread plates in position includes opposedly opening grooves 76 formed in the sides of the segments 58 as seen in Figs. 9, 11 and 12.

It is to be understood that the detailed description and drawings are not to be considered restrictive of the invention, but merely illustrative thereof.

We claim:

1. A retreading mold comprising a matrix providing an annular tread curing surface, said matrix being divided into a plurality of segments, means supporting said segments for bodily movement radially of the axis of said matrix and free from pivotal movement from curing position with said segments in end to end adjoining relation to open position in which said segments are spaced from each other in a common plane, heating means for said matrix in heat exchange relation thereto when said matrix is in said curing position, said matrix and said heating means being relatively movable to spaced relation for rendering said heating means inoperative for supplying heat to said matrix, and means for causing said relative movement of said matrix and said heating means, the upwardly projected area over said matrix being free at all times from obstruction to insertion of a tire casing into said matrix and to removal of a tire casing therefrom.

2. A retreading mold comprising a matrix providing an annular tread curing surface, said matrix being divided into a plurality of segments, means supporting said segments for bodily movement radially of the axis of said matrix and free from pivotal movement from curing position with said segments in end to end adjoining relation to open position in which said segments are spaced from each other in a common plane, a hollow annular member for circumferentially enclosing said matrix when the latter is in said curing position in heat transfer relationship with said matrix providing a steam chamber for supplying heat to said matrix, means supporting said member and said matrix for axial movement relative to each other to spaced relation during all of said movement of said segments radially of said axis whereby said matrix and said member will be moved simultaneously axially and radially out of heat transfer relationship with each other when said matrix is moved to open position.

3. A retreading mold comprising an annular matrix divided into a plurality of segments, means supporting said segments for bodily movement radially of the axis of said matrix and free from pivotal movement from a curing position with said segments in end to end adjoining relation to open position with said segments spaced apart in a common plane, means supporting said segments for movement axially of said axis, means for simultaneously so moving said segments axially and radially, and a heater positioned for heating said segments when the latter is in said curing position only.

4. A retreading mold comprising an annular matrix divided into a plurality of segments, means supporting said segments for movement radially of the axis of said matrix from a curing position with said segments in end to end adjoining relation to open position with said segments spaced apart in a common plane, an annular heater in heat transfer relation with the outer periphery of said matrix when the latter is in said curing position, means for relatively moving said heater and said matrix axially of said axis for urging said segments to said open position, said matrix being adapted to circumferentially enclose a tire casing when in said curing position with said casing coaxial therewith, and means for holding such casing from movement radially of said axis upon movement of said segments to said open position.

5. A retreading mold comprising an annular matrix divided into a plurality of segments, means supporting said segments for bodily movement radially of the axis of said matrix and free from pivotal movement from a curing position with said segments in end to end adjoining relation to open position with said segments spaced apart in a common plane, an annular heater for circumferentially enclosing said matrix in heat transfer relation thereto when said matrix is in said curing position, and said first mentioned means including a table movable axially with said segments for supporting a tire casing coaxial with said matrix and in said common plane when said matrix is in said open position.

6. A retreading mold comprising an annular generally horizontally positioned matrix divided into a plurality of segments, said segments being movable bodily radially of the axis of said matrix and free from pivotal movement from a curing position with their ends in adjoining end to end relation to an open position with said segments spaced apart in a common plane, means supporting said segments for said movement, means for simultaneously so moving said segments, and means for heating said segments equally when they are in said curing position, said means supporting said segments including a table movable with said segments below said matrix and movable axially with said segments for supporting a tire casing within the confines of said matrix and in said common plane.

7. A retreading mold comprising an annular generally horizontally positioned matrix divided into a plurality of segments, said segments being movable bodily radially of the axis of said matrix and free from pivotal movement from a curing position with their ends in adjoining end to end relation to an open position with said segments spaced apart in a common plane, means supporting said segments for said movement, means for simultaneously so moving said segments, the outer peripheral surfaces of said segments being tapered outwardly transversely thereof in an upward direction, an annular heater circumferentially enclosing said segments when the latter are in said curing position, said heater having a radially inwardly facing surface tapered to correspond with the tapered peripheral surfaces of said segments and in close heat transfer relation with the said peripheral surfaces when said segments are in said closed position, and means for moving said segments and said heater relatively axially of the axis of said heater upon said movement of said segments radially, said relative movement being in a direction for spacing said matrix at a level above that of said heater.

8. A retreading mold comprising an annular generally horizontally positioned matrix divided into a plurality of segments, a platform slidably supporting said segments for bodily movement radially of the axis of said matrix from a curing position in which the ends of said segments are in end to end adjoining relation to an open position in which said segments are spaced apart in a common plane, an annular heater circumferentially enclosing said matrix in heat transfer relation thereto when said segments are in said curing position, a plurality of links respectively pivotally connected at their ends with said heater and with said respective segments, said links extending radially of the axis of said matrix when said segments are in said closed position enclosed by said heater, and means for moving said heater and said matrix axially relative to each other whereby the ends of the links connected with said segments will be caused to swing radially outwardly of said axis for moving said segments to said open position.

9. A retreading mold comprising an annular generally horizontally positioned matrix divided into a plurality of segments, a platform slidably supporting said segments for bodily movement radially of the axis of said matrix from a curing position in which the ends of said segments are in end to end adjoining relation to an open position in which said segments are spaced apart in a common plane, an annular heater circumferentially enclosing said matrix in heat transfer relation thereto when said segments are in said curing position, a plurality of links respectively pivotally connected at their ends with said heater and with said respective segments, said links extending radially of the axis of said matrix when said segments are in said closed position enclosed by said heater, and means for moving said heater and said matrix axially relative to each other whereby the ends of the links connected with said segments will be caused to swing radially outwardly of said axis for moving said segments to said open position, said means for moving said heater and said matrix axially relative to each other including a fluid actuated piston rod coaxial with the axis of said matrix connected with said platform for axially moving said platform and matrix away from said heater, and means for holding said heater stationary during said movement of said platform.

10. A retreading mold comprising an annular matrix divided into a plurality of segments, a tread plate removably supported in each of said segments for movement into and out of each segment in a direction circumferentially of said matrix, means supporting said segments for movement radially of the axis of said matrix from a curing position with said tread plates in end to end adjoining relation to open position with said segments and said tread plates spaced apart whereby said tread plates may be removed from said segments for replacement when said segments are in said open position, an annular heater circumferentially enclosing said segments in heat transfer relation thereto when said segments and tread plates are in said curing position, said heater being a hollow member providing an annular chamber for steam, means for relatively moving said heater and said matrix to spaced relation in different planes upon movement of said segments to said open position, said means including links pivotally connecting said segments with said heater.

HAROLD L. BAKER.
RAYMOND D. VAN TASSELL.

REFERENCES CITED

The following references are of record in the file of this patent:

UNITED STATES PATENTS

| Number | Name | Date |
|---|---|---|
| 1,642,947 | Fischer | Sept. 20, 1927 |
| 1,679,788 | Schroeder | Aug. 7, 1928 |
| 1,801,335 | Denmire | Apr. 21, 1931 |
| 1,916,798 | Hottel | July 4, 1933 |
| 2,023,002 | Bosomworth | Dec. 3, 1935 |
| 2,024,554 | Vogt | Dec. 17, 1935 |
| 2,186,882 | Rawls et al. | Jan. 9, 1940 |
| 2,305,412 | Frolich et al. | Dec. 15, 1942 |
| 2,330,762 | Tooker | Sept. 28, 1943 |
| 2,345,172 | Bacon | Mar. 28, 1944 |
| 2,372,644 | Bacon | Apr. 3, 1945 |

FOREIGN PATENTS

| Number | Country | Date |
|---|---|---|
| 113,854 | Austria | July 25, 1929 |